(12) United States Patent
Li

(10) Patent No.: US 11,200,136 B2
(45) Date of Patent: Dec. 14, 2021

(54) DATA MONITORING METHODS, APPARATUSES, ELECTRONIC DEVICES, AND COMPUTER READABLE STORAGE MEDIA

(71) Applicant: Advanced New Technologies Co., Ltd., Grand Cayman (KY)

(72) Inventor: Yuzhu Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/086,172

(22) Filed: Oct. 30, 2020

(65) Prior Publication Data

US 2021/0049087 A1 Feb. 18, 2021

Related U.S. Application Data

(63) Continuation of application No. PCT/CN2019/094858, filed on Jul. 5, 2019.

(30) Foreign Application Priority Data

Jul. 27, 2018 (CN) .......................... 201810845091.7

(51) Int. Cl.
*G06F 11/30* (2006.01)
(52) U.S. Cl.
CPC ...... *G06F 11/3072* (2013.01); *G06F 11/3006* (2013.01)
(58) Field of Classification Search
CPC ............. G06F 11/3072; G06F 11/3006; G06F 11/3075; G06F 11/3003; G06F 11/30;
(Continued)

(56) References Cited

U.S. PATENT DOCUMENTS 9,191,296 B2 * 11/2015 Dinger ................ H04L 43/0876
2010/0052924 A1 * 3/2010 Bajpay ................ H04L 41/0631
340/635
(Continued)

FOREIGN PATENT DOCUMENTS

CN 102740247 10/2012
CN 103942604 7/2014
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Yolanda L Wilson
(74) *Attorney, Agent, or Firm* — Fish & Richardson P.C.

(57) ABSTRACT

Embodiments of the present specification disclose data monitoring methods, apparatuses, electronic devices, and computer readable storage media. In an embodiment, a method comprising: receiving, from a network device, data at a frequency range higher than a predetermined frequency; determining whether the data belongs to a currently monitored data interval; in response to determining that the data does not belong to the currently monitored data interval, determining whether the data belongs to an abnormal data interval of a plurality of abnormal data intervals; in response to determining that the data belongs to the abnormal data interval, updating the abnormal data interval based on the data; and updating the currently monitored data interval to be the abnormal data interval in response to determining that the abnormal data interval satisfies a predetermined condition.

24 Claims, 12 Drawing Sheets

(58) Field of Classification Search
CPC ... G06F 17/40; G06F 21/552; H04L 41/0622; H04L 41/0604; H04L 41/06; H04L 43/067; H04L 43/028
See application file for complete search history.

(56) References Cited

U.S. PATENT DOCUMENTS

| | | | | |
|---|---|---|---|---|
| 2012/0166745 | A1* | 6/2012 | Retnamma | G06F 11/1469 |
| | | | | 711/162 |
| 2013/0246001 | A1* | 9/2013 | Uchida | G06F 11/3006 |
| | | | | 702/182 |
| 2016/0204992 | A1* | 7/2016 | Wu | H04L 43/10 |
| | | | | 709/224 |
| 2017/0163669 | A1* | 6/2017 | Brown | G06N 5/04 |
| 2017/0339178 | A1* | 11/2017 | Mahaffey | G06F 11/3452 |
| 2018/0217888 | A1* | 8/2018 | Colgrove | G06F 11/076 |

FOREIGN PATENT DOCUMENTS

| | | | | |
|---|---|---|---|---|
| CN | 104348747 | | 2/2015 | |
| CN | 104811344 | | 7/2015 | |
| CN | 105897501 | | 8/2016 | |
| CN | 105898501 | A * | 8/2016 | ............ H04L 67/02 |
| CN | 106557401 | | 4/2017 | |
| CN | 106557401 | A * | 4/2017 | |
| CN | 106815255 | | 6/2017 | |
| CN | 107766299 | | 3/2018 | |
| CN | 109344026 | | 2/2019 | |
| TW | 201822018 | | 6/2018 | |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2019/094858, dated Sep. 24, 2019, 11 pages (with partial English translation).
EP Extended Search Report in European Application No. 19841618.2, dated Apr. 29, 2021, 8 pages.
PCT International Preliminary Report on Patentability in International Application No. PCT/CN2019/094858, dated Feb. 2, 2021, 11 pages (with partial English translation).

* cited by examiner

DATA MONITORING METHODS, APPARATUSES, ELECTRONIC DEVICES, AND COMPUTER READABLE STORAGE MEDIA

CROSS-REFERENCE TO RELATED APPLICATIONS

This application is a continuation of PCT Application No. PCT/CN2019/094858, filed on Jul. 5, 2019, which claims priority to Chinese Patent Application No. 201810845091.7, filed on Jul. 27, 2018, and each application is hereby incorporated by reference in its entirety.

TECHNICAL FIELD

Embodiments of the present specification relate to the field of data processing technologies, and specifically, to data monitoring methods, apparatuses, electronic devices, and computer readable storage media.

BACKGROUND

With the development of Internet technologies and the advancement of science and technology, all industries need various big data to support the implemented technologies. To accurately grasp data dynamics, data usually needs to be collected, monitored, and updated in real time. During real-time monitoring of data, there may be large-scale data fluctuations. Some of these data fluctuations are caused by noise, and some are normal data changes, which reflect the normal data trend. However, in the existing technologies, whether new data is valid and whether it belongs to noise are usually determined only by comparing whether a difference between two pieces of adjacent data is within a normal range. Consequently, normal but large-scale data fluctuations may be misjudged, causing adverse impact on data collection and monitoring.

SUMMARY

Embodiments of the present specification provide data monitoring methods, apparatuses, electronic devices, and computer readable storage media.

According to a first aspect, some embodiments of the present specification provide a data monitoring method.

Specifically, the data monitoring method includes the following: determining, in response to receiving data, whether the data belongs to a current monitoring data interval, where frequency of receiving the data is higher than a predetermined frequency threshold; when the data does not belong to the current monitoring data interval, determining whether there is an abnormal data interval that matches the data, and when there is an abnormal data interval that matches the data, updating the abnormal data interval based on the data; and when the abnormal data interval satisfies a first predetermined condition, determining the abnormal data interval as the current monitoring data interval.

With reference to the first aspect, in a first implementation of the first aspect of some embodiments of the present specification, the determining, in response to receiving data, whether the data belongs to a current monitoring data interval includes the following: determining, in response to receiving the data, whether there is a current monitoring data interval; when there is a current monitoring data interval, determining whether the data belongs to the current monitoring data interval; or when there is no current monitoring data interval, creating a current monitoring data interval based on the received data.

With reference to the first aspect and the first implementation of the first aspect, in a second implementation of the first aspect of some embodiments of the present specification, after the determining, in response to receiving data, whether the data belongs to a current monitoring data interval, the method includes the following: when the data belongs to the current monitoring data interval, updating the current monitoring data interval based on the data.

With reference to the first aspect, the first implementation of the first aspect, and the second implementation of the first aspect, in a third implementation of the first aspect of some embodiments of the present specification, the step of updating the current monitoring data interval based on the data when the data belongs to the current monitoring data interval includes the following: when the data belongs to the current monitoring data interval, updating the current monitoring data interval based on the data; and deleting the abnormal data interval.

With reference to the first aspect, the first implementation of the first aspect, the second implementation of the first aspect, and the third implementation of the first aspect, in a fourth implementation of the first aspect of some embodiments of the present specification, the determining, when the data does not belong to the current monitoring data interval, whether there is an abnormal data interval that matches the data, and the updating, when there is an abnormal data interval that matches the data, the abnormal data interval based on the data include the following: when the data does not belong to the current monitoring data interval, determining whether there is an abnormal data interval that matches the data; when there is an abnormal data interval that matches the data, updating the abnormal data interval based on the data; or when there is no abnormal data interval that matches the data, creating an abnormal data interval.

With reference to the first aspect, the first implementation of the first aspect, the second implementation of the first aspect, the third implementation of the first aspect, and the fourth implementation of the first aspect, in a fifth implementation of the first aspect of some embodiments of the present specification, the creating an abnormal data interval when there is no abnormal data interval that matches the data includes the following: when there is no abnormal data interval that matches the data, determining whether a quantity of the abnormal data intervals is greater than a predetermined quantity threshold; when the quantity of the abnormal data intervals is greater than the predetermined quantity threshold, deleting an abnormal data interval that satisfies a second predetermined condition, and creating an abnormal data interval; or when the quantity of the abnormal data intervals is not greater than the predetermined quantity threshold, creating an abnormal data interval.

With reference to the first aspect, the first implementation of the first aspect, the second implementation of the first aspect, the third implementation of the first aspect, the fourth implementation of the first aspect, and the fifth implementation of the first aspect, in a sixth implementation of the first aspect of some embodiments of the present specification, the determining, when the abnormal data interval satisfies a first predetermined condition, the abnormal data interval as the current monitoring data interval includes the following: when the abnormal data interval satisfies the first predetermined condition, determining the abnormal data interval as the current monitoring data interval; and deleting the abnormal data interval.

With reference to the first aspect, the first implementation of the first aspect, the second implementation of the first aspect, the third implementation of the first aspect, the fourth implementation of the first aspect, the fifth implementation of the first aspect, and the sixth implementation of the first aspect, in a seventh implementation of the first aspect of some embodiments of the present specification, updating the current monitoring data interval or the abnormal data interval based on the data includes one or more of the following update operations: updating an interval central value of the current monitoring data interval or the abnormal data interval into the data, and updating an interval range of the current monitoring data interval or the abnormal data interval based on a predetermined interval length; updating a data amount of the current monitoring data interval or the abnormal data interval; and updating a data update time of the current monitoring data interval or the abnormal data interval.

According to a second aspect, some embodiments of the present specification provide a data monitoring apparatus.

Specifically, the data monitoring apparatus includes the following: a first determination module, configured to determine, in response to receiving data, whether the data belongs to a current monitoring data interval, where frequency of receiving the data is higher than a predetermined frequency threshold; a second determination module, configured to: when the data does not belong to the current monitoring data interval, determine whether there is an abnormal data interval that matches the data, and when there is an abnormal data interval that matches the data, update the abnormal data interval based on the data; and a third determination module, configured to: when the abnormal data interval satisfies a first predetermined condition, determine the abnormal data interval as the current monitoring data interval.

With reference to the second aspect, in a first implementation of the second aspect of some embodiments of the present specification, the first determination module includes the following: a first determination sub-module, configured to determine, in response to receiving the data, whether there is a current monitoring data interval; a second determination sub-module, configured to: when there is a current monitoring data interval, determine whether the data belongs to the current monitoring data interval; and a creation sub-module, configured to: when there is no current monitoring data interval, create a current monitoring data interval based on the received data.

With reference to the second aspect and the first implementation of the second aspect, in a second implementation of the second aspect of some embodiments of the present specification, the apparatus further includes the following: an update module, configured to: when the data belongs to the current monitoring data interval, update the current monitoring data interval based on the data.

With reference to the second aspect, the first implementation of the second aspect, and the second implementation of the second aspect, in a third implementation of the second aspect of some embodiments of the present specification, the update module includes the following: a first update sub-module, configured to: when the data belongs to the current monitoring data interval, update the current monitoring data interval based on the data; and a first deletion sub-module, configured to delete the abnormal data interval.

With reference to the second aspect, the first implementation of the second aspect, the second implementation of the second aspect, and the third implementation of the second aspect, in a fourth implementation of the second aspect of some embodiments of the present specification, the second determination module includes the following: a third determination sub-module, configured to: when the data does not belong to the current monitoring data interval, determine whether there is an abnormal data interval that matches the data; a second update sub-module, configured to: when there is an abnormal data interval that matches the data, update the abnormal data interval based on the data; and a first creation sub-module, configured to: when there is no abnormal data interval that matches the data, create an abnormal data interval.

With reference to the second aspect, the first implementation of the second aspect, the second implementation of the second aspect, the third implementation of the second aspect, and the fourth implementation of the second aspect, in a fifth implementation of the second aspect of some embodiments of the present specification, the first creation sub-module includes the following: a fourth determination sub-module, configured to: when there is no abnormal data interval that matches the data, determine whether a quantity of the abnormal data intervals is greater than a predetermined quantity threshold; a second creation sub-module, configured to: when the quantity of the abnormal data intervals is greater than the predetermined quantity threshold, delete an abnormal data interval that satisfies a second predetermined condition, and create an abnormal data interval; and a third creation sub-module, configured to: when the quantity of the abnormal data intervals is not greater than the predetermined quantity threshold, create an abnormal data interval.

With reference to the second aspect, the first implementation of the second aspect, the second implementation of the second aspect, the third implementation of the second aspect, the fourth implementation of the second aspect, and the fifth implementation of the second aspect, in a sixth implementation of the second aspect of some embodiments of the present specification, the third determination module includes the following: a fifth determination sub-module, configured to: when the abnormal data interval satisfies a first predetermined condition, determine the abnormal data interval as the current monitoring data interval; and a second deletion sub-module, configured to delete the abnormal data interval.

With reference to the second aspect, the first implementation of the second aspect, the second implementation of the second aspect, the third implementation of the second aspect, the fourth implementation of the second aspect, the fifth implementation of the second aspect, and the sixth implementation of the second aspect, in a seventh implementation of the second aspect of some embodiments of the present specification, the update module or the update sub-module is configured to perform one or more of the following update operations: updating an interval central value of the current monitoring data interval or the abnormal data interval into the data, and updating an interval range of the current monitoring data interval or the abnormal data interval based on a predetermined interval length; updating a data amount of the current monitoring data interval or the abnormal data interval; and updating a data update time of the current monitoring data interval or the abnormal data interval.

According to a third aspect, some embodiments of the present specification provide an electronic device, including a memory and a processor. The memory is configured to store one or more computer instructions that support a data monitoring apparatus in performing the data monitoring method in the first aspect. The processor is configured to execute the computer instructions stored in the memory. The data monitoring apparatus can further include a communications interface for communication between the data monitoring apparatus and another device or communications network.

According to a fourth aspect, some embodiments of the present specification provide a computer readable storage medium, configured to store a computer instruction used by the data monitoring apparatus. The computer instruction includes a computer instruction used by the data monitoring apparatus to perform the data monitoring method in the first aspect.

The technical solutions provided in some embodiments of the present specification can include the following beneficial effects:

According to the previous technical solutions, multiple data intervals are set, newly received data is sequentially compared with the multiple data intervals, and it is determined, based on characteristics of the data intervals, whether the newly received data belongs to normal data fluctuations. The technical solutions can alleviate misjudgment of normal but large-scale data fluctuations, thereby implementing accurate data monitoring.

It should be understood that the previous general description and the following detailed description are merely examples and explanations, and cannot limit some embodiments of the present specification.

BRIEF DESCRIPTION OF DRAWINGS

With reference to the accompanying drawings and detailed descriptions of the following non-limitative implementations, other features, purposes, and advantages of some embodiments of the present specification become clearer. In the drawings.

DESCRIPTION OF EMBODIMENTS

Figure 1:
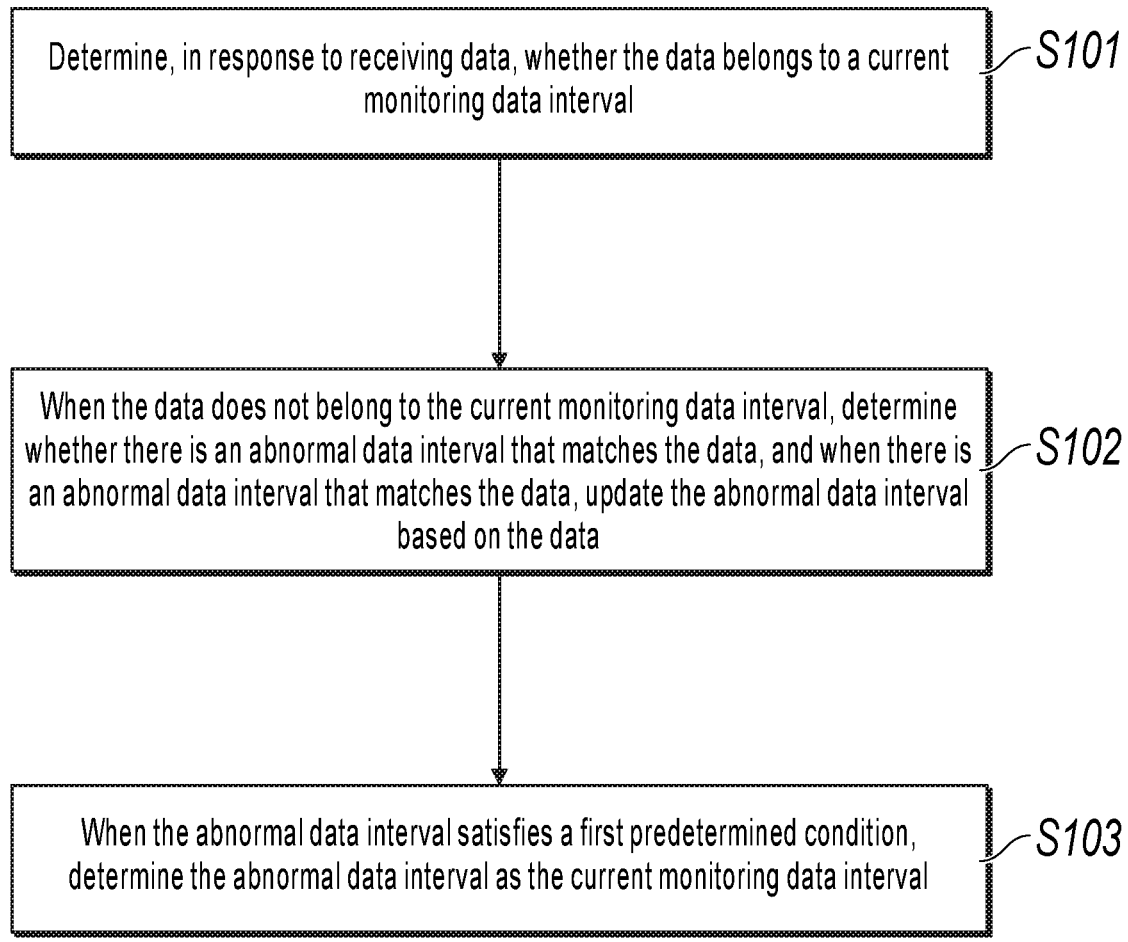
FIG. 1 is a flowchart illustrating a data monitoring method, according to some embodiments of the present specification.

The following describes example implementations of some embodiments of the present specification in detail with reference to the accompanying drawings, so that a person skilled in the art can easily implement them. In addition, for clarity, parts unrelated to the description of the example implementations are omitted in the drawings.

In some embodiments of the present specification, it should be understood that terms such as "include" or "have" are intended to indicate the existence of features, numbers, steps, behaviors, components, parts, or combinations thereof disclosed in the present specification, and are not intended to exclude the possibility that one or more other features, numbers, steps, behaviors, components, parts, or combinations thereof exist or are added.

In addition, it is worthwhile to further note that, some embodiments in the present specification and the features in some embodiments can be mutually combined provided that no conflict exists. Some embodiments of the present specification are described in detail in the following with reference to the accompanying drawings and embodiments.

According to the technical solutions provided in some embodiments of the present specification, multiple data intervals are set, newly received data is sequentially compared with the multiple data intervals, and it is determined, based on characteristics of the data intervals, whether the newly received data belongs to normal data fluctuations. The technical solutions can alleviate misjudgment of normal but large-scale data fluctuations, thereby implementing accurate data monitoring.

FIG. 1 is a flowchart illustrating a data monitoring method, according to some embodiments of the present specification. As shown in FIG. 1, the data monitoring method includes the following steps S101 to S103.

Step S101: Determine, in response to receiving data, whether the data belongs to a current monitoring data interval, where frequency of receiving the data is higher than a predetermined frequency threshold.

Step S102: When the data does not belong to the current monitoring data interval, determine whether there is an abnormal data interval that matches the data, and when there is an abnormal data interval that matches the data, update the abnormal data interval based on the data.

Step S103: When the abnormal data interval satisfies a first predetermined condition, determine the abnormal data interval as the current monitoring data interval.

As mentioned previously, during real-time monitoring of data, large-scale data fluctuations may occur. Some of these data fluctuations are caused by noise, such as data source errors or abnormal data generation behaviors. Such data fluctuations are characterized in that the data will fall back to normal after a sudden change. Some data fluctuations are normal data changes. Such data fluctuations are characterized in that the data will not fall back after a sudden change, which reflects the normal data trend. However, in the existing technologies, whether newly received data is valid and whether it belongs to noise are usually determined only by comparing whether a difference between the newly received data and the adjacent received data is within a normal range. If the difference between the newly received data and the adjacent received data is within a normal range, it is determined that the newly received data is valid. Otherwise, the newly received data is considered invalid and it belongs to noise. Consequently, normal but large-scale data fluctuations may be misjudged, and the misjudgment further needs to be identified and corrected manually. Clearly, the previous processing method in the existing technologies greatly reduces the accuracy of data monitoring and causes adverse impact on data collection and monitoring.

Considering the previous disadvantages, a data monitoring method is provided in the present implementation. In the method, after data is received, it is first determined whether the data belongs to a current monitoring data interval. The current monitoring data interval represents a historical data change trend formed by historical data that was received before a current moment. If the data does not belong to the current monitoring data interval, it is preliminarily determined that the new data may deviate from the historical data change trend. In such case, it is further determined whether there is an abnormal data interval that matches the data. The abnormal data interval is used to assist in determining whether a new data change trend occurs. If there is an abnormal data interval that matches the data, the abnormal data interval is updated based on the data. Finally, when the abnormal data interval satisfies a first predetermined condition, the abnormal data interval is determined as the current monitoring data interval. At this time, the new data change trend is generated. According to the technical solutions, multiple data intervals are set, newly received data is sequentially compared with the multiple data intervals, and it is determined, based on characteristics of the data intervals, whether the newly received data belongs to normal data fluctuations. The technical solutions can alleviate misjudgment of normal but large-scale data fluctuations, thereby implementing accurate data monitoring.

Frequency of receiving the data is higher than a predetermined frequency threshold. In other words, the present implementation is more effective for receiving data more frequently.

A quantity of abnormal data intervals can be one, two or more. Certainly, a predetermined interval quantity threshold can also be set to limit the quantity of abnormal data intervals, so that the abnormal data intervals are not excessive; otherwise, accuracy of statistics on the data change trend is affected. When the quantity of the abnormal data intervals is two or more, there can be partial overlap or no overlap between the abnormal data intervals.

In some optional implementations of some embodiments, the abnormal data interval that matches the data means that the data falls within a value range of the abnormal data interval. For example, if a value range of a certain abnormal data interval is 2-6, the newly received data is 5, and 5 falls within the range 2-6. Therefore, it can be considered that the abnormal data interval matches the newly received data. If the newly received data is 7, and 7 does not belong to the range 2-6, it is considered that the abnormal data interval does not match the newly received data.

In some optional implementations of some embodiments, for example, the first predetermined condition can be that the data amount in the abnormal data interval is higher than a first predetermined data amount threshold, or can be that a quantity of times of updating the abnormal data interval is higher than a predetermined times threshold. Certainly, the first predetermined condition can also be set to other conditions, provided that the setting of the first predetermined condition can ensure that the abnormal data interval represents a certain, relatively stable, and new data change trend.

Interval lengths of the current monitoring data interval and the abnormal data interval, or value ranges of the current monitoring data interval and the abnormal data interval can be the same or different, which can be specifically set based on actual application needs. For example, if the current monitoring data interval is considered more important, the interval length of the abnormal data interval can be set to be greater than the interval length of the current monitoring data interval, so that the new data change trend can only replace the historical data change trend after it is sufficiently stable.

For example, assume that the current monitoring data interval is 9-15, there are three abnormal data intervals, the first abnormal data interval is 2-8, the second abnormal data interval is 16-22, the third abnormal data interval is 24-30, and the first predetermined data amount threshold is 6. If the newly received data is 18, it is determined that the data does not belong to the current monitoring data interval 9-15, but there is a second abnormal data interval 16-22 that matches the data, and then the second abnormal data interval is updated based on the new data 18. Then, it is determined whether the data amount in the second abnormal data interval is greater than 6. If the data amount in the second abnormal data interval is greater than 6, the second abnormal data interval 16-22 replaces the current monitoring data interval 9-15 to become a new current monitoring data interval.

Figure 2:
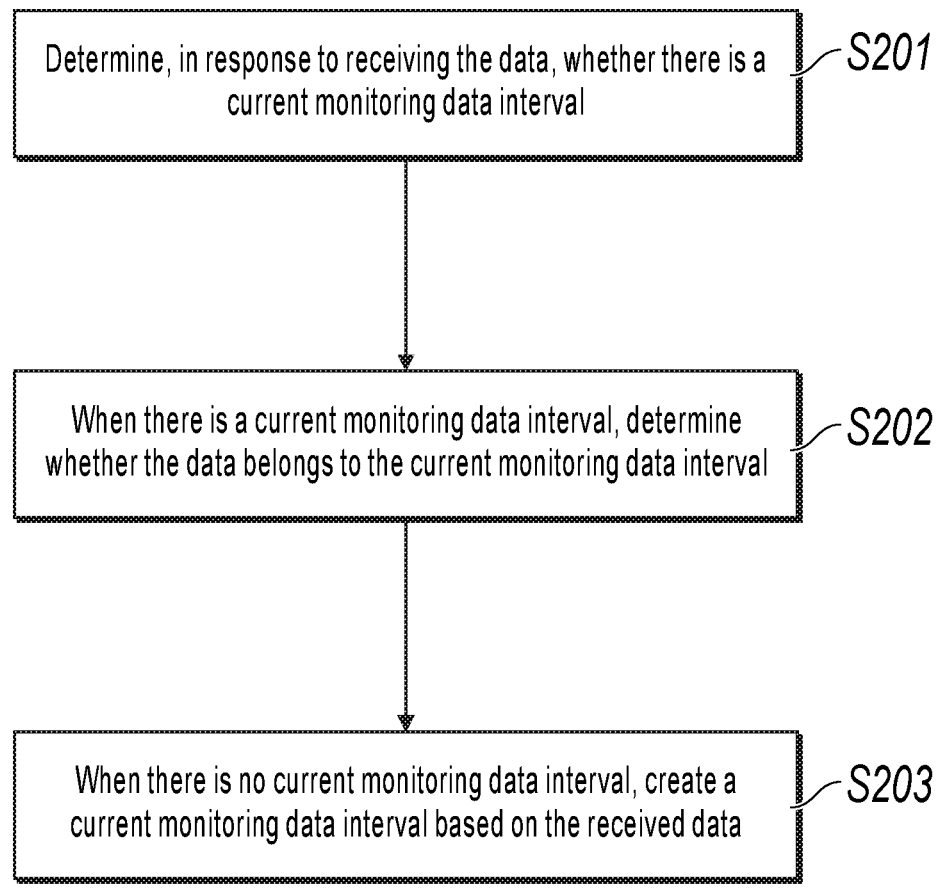
FIG. 2 is a flowchart illustrating step S101 of the data monitoring method, according to the embodiment shown in FIG. 1.

In some optional implementations of some embodiments, as shown in FIG. 2, step S101 of determining, in response to receiving data, whether the data belongs to a current monitoring data interval includes steps S201 to S203.

Step S201: Determine, in response to receiving the data, whether there is a current monitoring data interval.

Step S202: When there is a current monitoring data interval, determine whether the data belongs to the current monitoring data interval.

Step S203: When there is no current monitoring data interval, create a current monitoring data interval based on the received data.

In the present implementation, when new data is received, it is first determined whether there is a current monitoring data interval. If there is a current monitoring data interval, it is further determined whether the data belongs to the current monitoring data interval. If there is no current monitoring data interval, a current monitoring data interval is created based on the received data. The current monitoring data interval can be created by using the data as an interval central value and a predetermined interval length as a length. The creation time is used as an update time of the current monitoring data interval. Certainly, other interval creation methods can also be used, which is not limited in the present specification.

Figure 3:
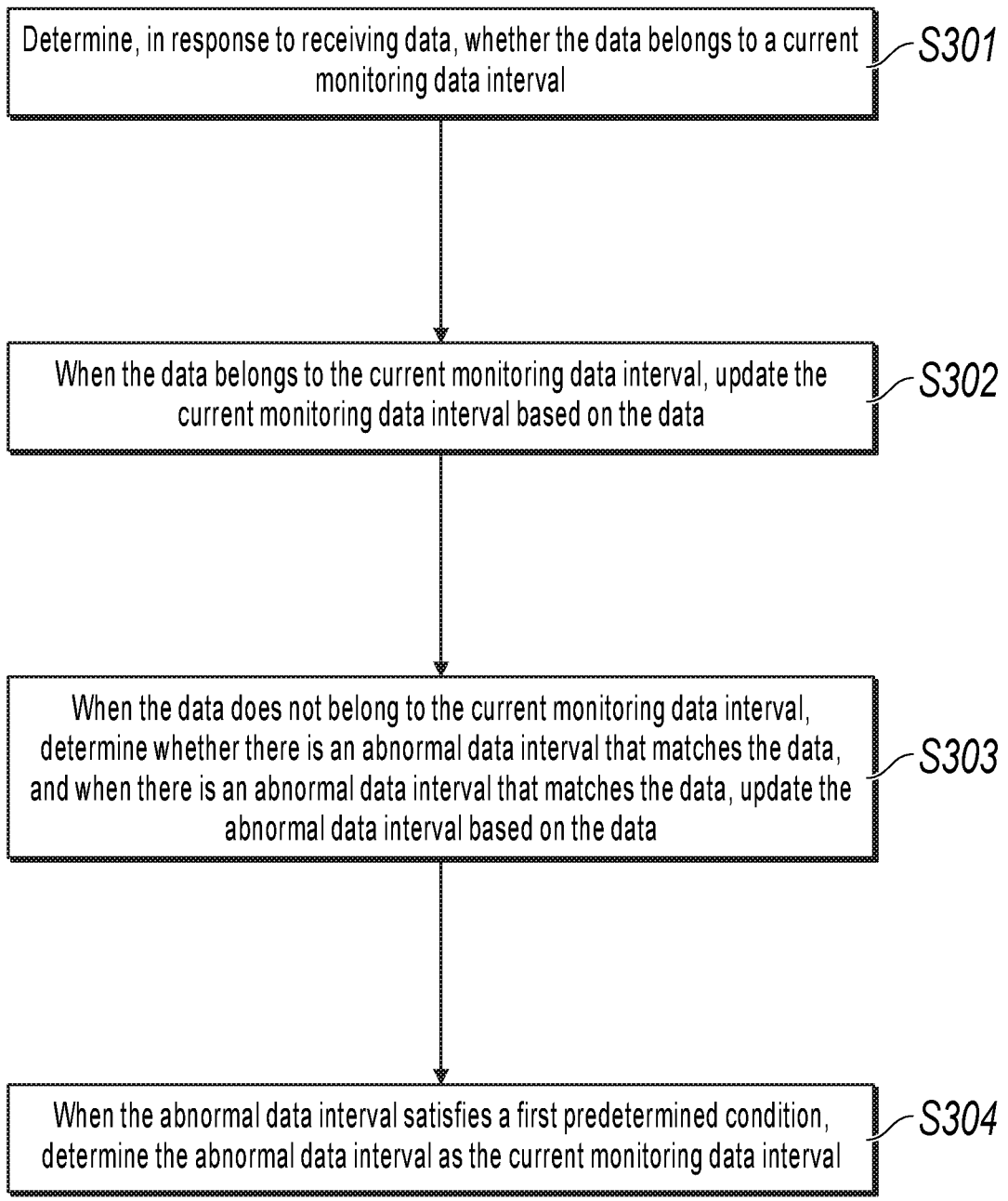
FIG. 3 is a flowchart illustrating a data monitoring method, according to other embodiments.

In some optional implementations of some embodiments, as shown in FIG. 3, after step S101 of determining, in response to receiving data, whether the data belongs to a current monitoring data interval, the method includes the step of updating the current monitoring data interval based on the data when the data belongs to the current monitoring data interval. To be specific, in the present implementation, the method includes the following steps S301 to S304.

Step S301: Determine, in response to receiving data, whether the data belongs to a current monitoring data interval, where frequency of receiving the data is higher than a predetermined frequency threshold.

Step S302: When the data belongs to the current monitoring data interval, update the current monitoring data interval based on the data.

Step S303: When the data does not belong to the current monitoring data interval, determine whether there is an abnormal data interval that matches the data, and when there is an abnormal data interval that matches the data, update the abnormal data interval based on the data.

Step S304: When the abnormal data interval satisfies a first predetermined condition, determine the abnormal data interval as the current monitoring data interval.

In the present implementation, when it is determined that the newly received data belongs to the current monitoring data interval, it is considered that the newly received data still follows the historical data change trend, and the current monitoring data interval is updated based on the newly received data.

Figure 4:
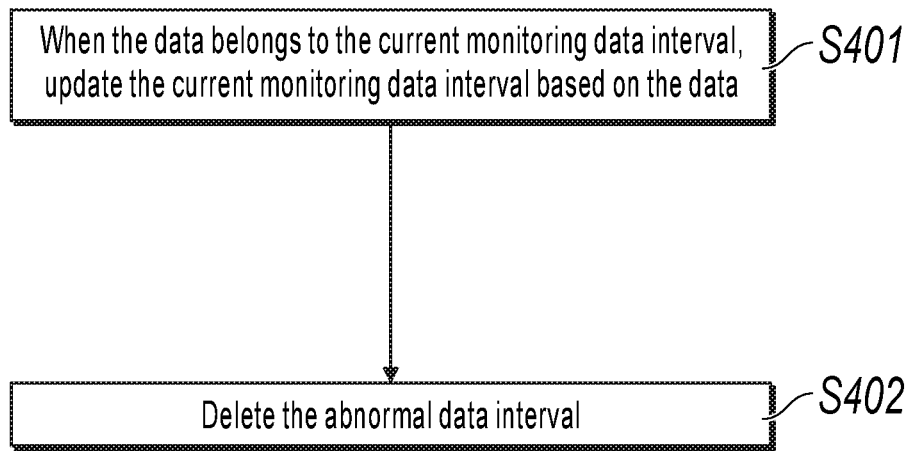
FIG. 4 is a flowchart illustrating step S302 of the data monitoring method, according to the embodiment shown in FIG. 3.

In some optional implementations of some embodiments, as shown in FIG. 4, step S302 of updating the current monitoring data interval based on the data when the data belongs to the current monitoring data interval includes steps S401 and S402.

Step S401: When the data belongs to the current monitoring data interval, update the current monitoring data interval based on the data.

Step S402: Delete the abnormal data interval.

In the present implementation, when it is determined that the newly received data belongs to the current monitoring data interval, it is considered that the newly received data still follows the historical data change trend. In such case, one or more abnormal data intervals that existed previously no longer have too much reference value. Therefore, after the current monitoring data interval is updated based on the newly received data, all abnormal data intervals can be deleted.

Updating the current monitoring data interval or the abnormal data interval based on the data includes one or more of the following update operations: updating an interval central value of the current monitoring data interval or the abnormal data interval into the data, and updating an interval range of the current monitoring data interval or the abnormal data interval based on a predetermined interval length; for example, assuming that the current monitoring data interval or the abnormal data interval is 9-15, the central value is 12, and the predetermined interval length is 7, if the newly received data is 14, after the current monitoring data interval or abnormal data interval is updated, the new current monitoring data interval or abnormal data interval becomes the interval 11-17 with the newly received data 14 as the central value and a length of 7; updating a data amount of the current monitoring data interval or the abnormal data interval; and updating a data update time of the current monitoring data interval or the abnormal data interval, where the data update time is used to represent timeliness of the current monitoring data interval or the abnormal data interval.

Figure 5:
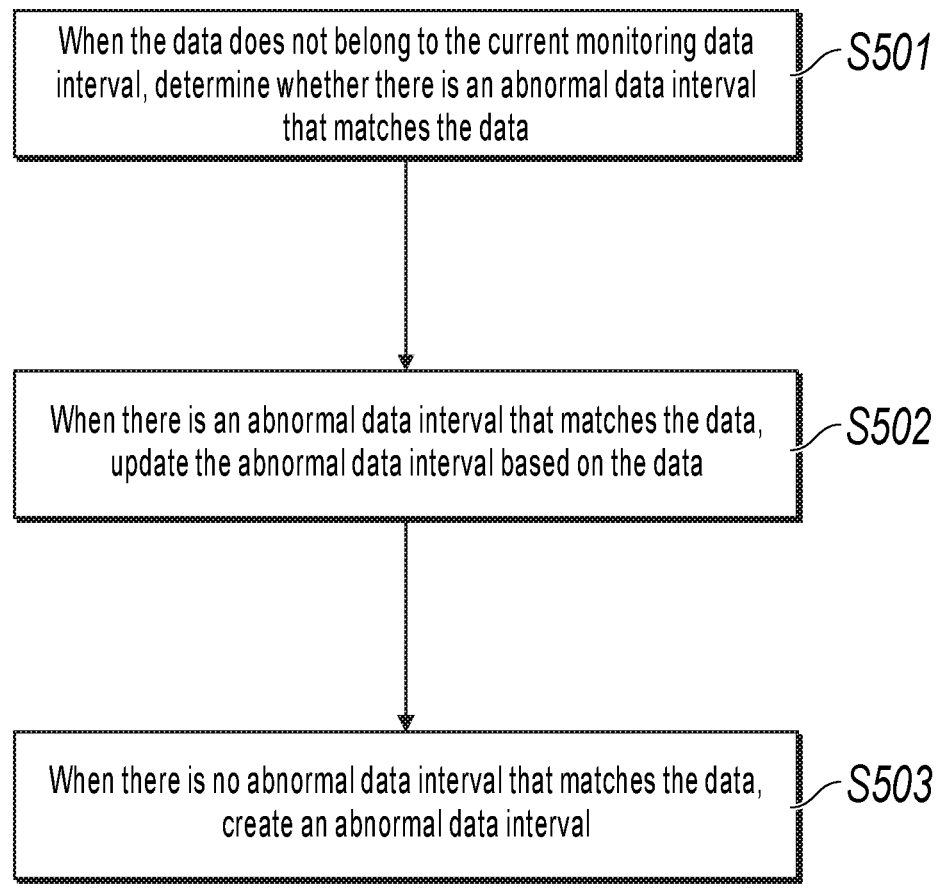
FIG. 5 is a flowchart illustrating step S102 of the data monitoring method, according to the embodiment shown in FIG. 1.

In some optional implementations of some embodiments, as shown in FIG. 5, step S102 of determining, when the data does not belong to the current monitoring data interval, whether there is an abnormal data interval that matches the data, and updating, when there is an abnormal data interval that matches the data, the abnormal data interval based on the data includes steps S501 to S503.

Step S501: When the data does not belong to the current monitoring data interval, determine whether there is an abnormal data interval that matches the data.

Step S502: When there is an abnormal data interval that matches the data, update the abnormal data interval based on the data.

Step S503: When there is no abnormal data interval that matches the data, create an abnormal data interval.

In the present implementation, when it is determined that the newly received data does not belong to the current monitoring data interval, it is first determined whether there is an abnormal data interval that matches the data. Further, if there is an abnormal data interval that matches the data, the abnormal data interval is updated based on the data. If there is no abnormal data interval that matches the data, an abnormal data interval is created. Similar to creation of the current monitoring data interval previously described, the abnormal data interval can be created by using the data as an interval central value and a predetermined interval length as a length. The creation time is used as an update time of the abnormal data interval. Other interval creation methods can also be used.

Figure 6:
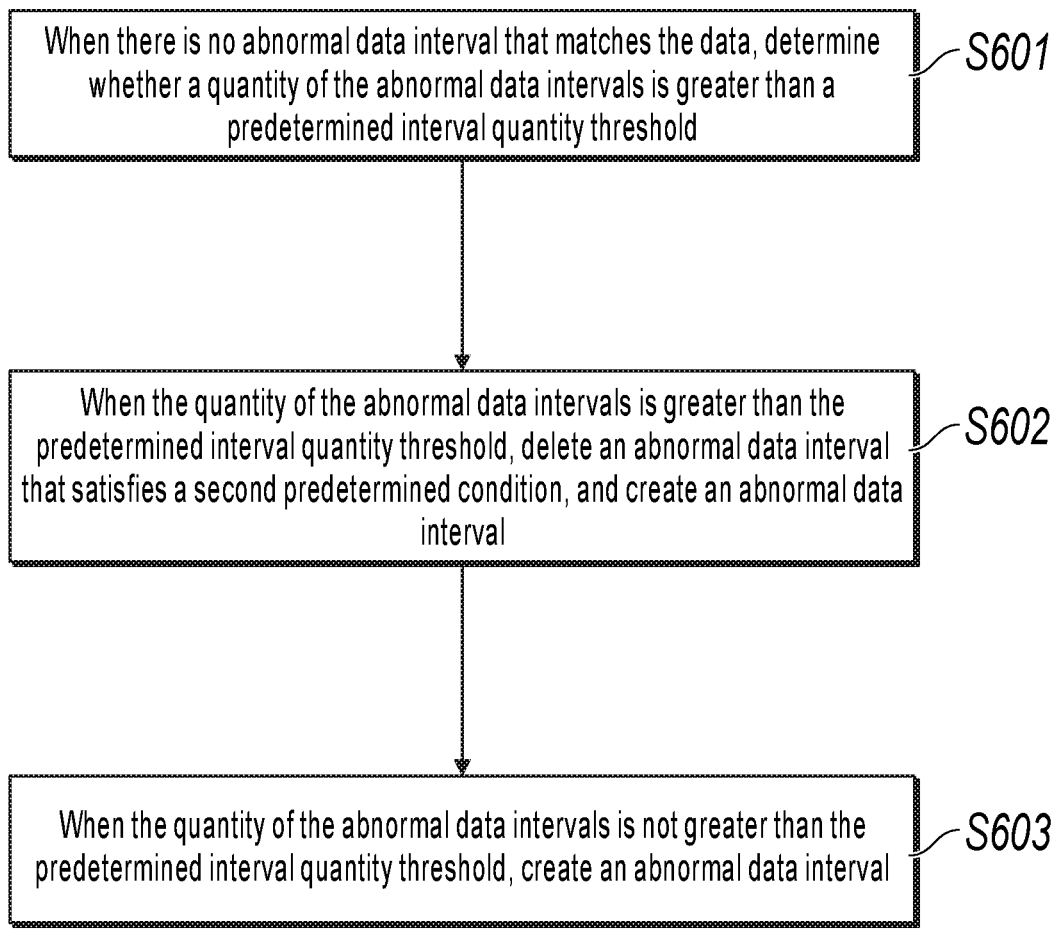
FIG. 6 is a flowchart illustrating step S503 of the data monitoring method, according to the embodiment shown in FIG. 5.

In some optional implementations of some embodiments, as shown in FIG. 6, step S503 of creating an abnormal data interval when there is no abnormal data interval that matches the data includes steps S601 to S603.

Step S601: When there is no abnormal data interval that matches the data, determine whether a quantity of the abnormal data intervals is greater than a predetermined interval quantity threshold.

Step S602: When the quantity of the abnormal data intervals is greater than the predetermined interval quantity threshold, delete an abnormal data interval that satisfies a second predetermined condition, and create an abnormal data interval.

Step S603: When the quantity of the abnormal data intervals is not greater than the predetermined interval quantity threshold, create an abnormal data interval.

In the present implementation, considering that the quantity of abnormal data intervals should not be excessive; otherwise, accuracy of statistics on the data change trend is affected. Therefore, when it is determined that there is no abnormal data interval that matches the data, it is first determined whether the quantity of currently existing abnormal data intervals is greater than the predetermined interval quantity threshold. If yes, it indicates that the quantity of current abnormal data intervals is excessively large, and an abnormal data interval needs to be deleted and then an abnormal data interval is created. Otherwise, an abnormal data interval is created directly.

The second predetermined condition can be one or more of the following conditions: the update time of the abnormal data interval is earlier than the predetermined time threshold, that is, the abnormal data interval with an excessively early update time is deleted; and the data amount of the abnormal data interval is lower than the second predetermined data amount threshold, that is, the abnormal data interval with a small data amount is deleted.

Figure 7:
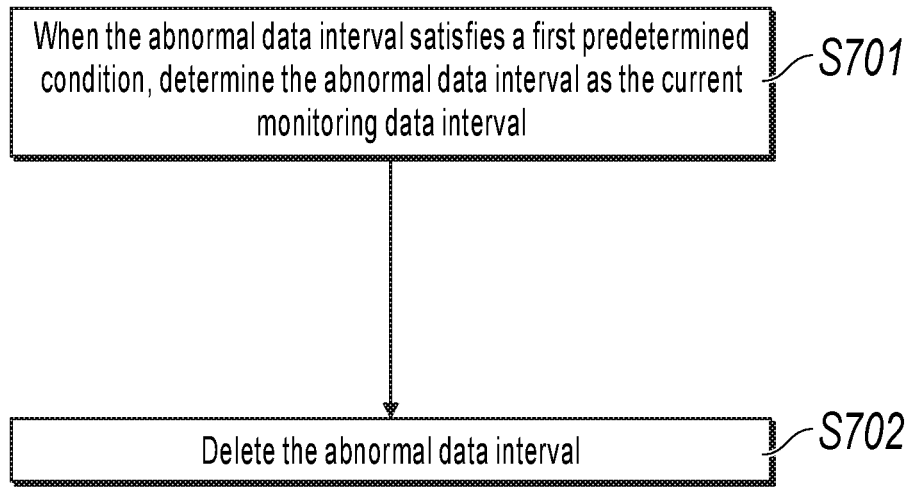
FIG. 7 is a flowchart illustrating step S103 of the data monitoring method, according to the embodiment shown in FIG. 1.

In some optional implementations of some embodiments, as shown in FIG. 7, step S103 of determining, when the abnormal data interval satisfies a first predetermined condition, the abnormal data interval as the current monitoring data interval includes steps S701 and S702.

Step S701: When the abnormal data interval satisfies a first predetermined condition, determine the abnormal data interval as the current monitoring data interval.

Step S702: Delete the abnormal data interval.

In the present implementation, when it is determined that the abnormal data interval satisfies the first predetermined condition, it is considered that the abnormal data interval is sufficient to represent the new data change trend, and other abnormal data intervals no longer have reference value. Therefore, after the abnormal data interval replaces the current monitoring data interval to become a new current monitoring data interval, all other abnormal data intervals are deleted.

The predetermined frequency threshold, the predetermined interval quantity threshold, the first predetermined data amount threshold, the predetermined number of times threshold, the predetermined time threshold, and the second predetermined data amount threshold can be set based on actual application needs, which is not limited in the present specification.

Apparatus embodiments of the present specification are provided in the following, and can be used to execute method embodiments of the present specification.

Figure 8:
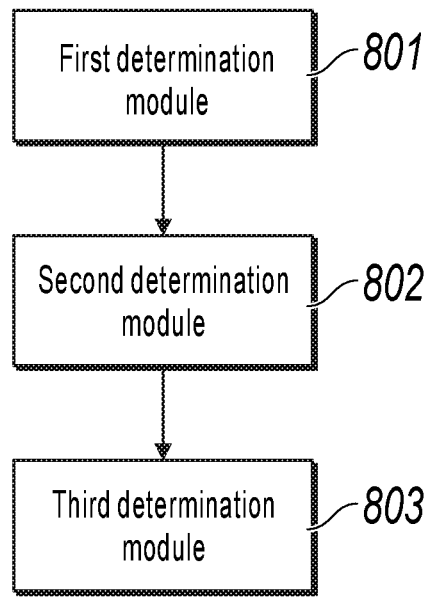
FIG. 8 is a structural block diagram illustrating a data monitoring apparatus, according to some embodiments of the present specification.

FIG. 8 is a structural block diagram illustrating a data monitoring apparatus, according to some embodiments of the present specification. The apparatus can be implemented as a part of an electronic device or the entire electronic device by using software, hardware, or a combination thereof. As shown in FIG. 8, the data monitoring apparatus includes the following: a first determination module 801, configured to determine, in response to receiving data, whether the data belongs to a current monitoring data interval, where frequency of receiving the data is higher than a predetermined frequency threshold; a second determination module 802, configured to: when the data does not belong to the current monitoring data interval, determine whether there is an abnormal data interval that matches the data, and when there is an abnormal data interval that matches the data, update the abnormal data interval based on the data; and a third determination module 803, configured to: when the abnormal data interval satisfies a first predetermined condition, determine the abnormal data interval as the current monitoring data interval.

As mentioned previously, during real-time monitoring of data, large-scale data fluctuations may occur. Some of these data fluctuations are caused by noise, such as data source errors or abnormal data generation behaviors. Such data fluctuations are characterized in that the data will fall back to normal after a sudden change. Some data fluctuations are normal data changes. Such data fluctuations are characterized in that the data will not fall back after a sudden change, which reflects the normal data trend. However, in the existing technologies, whether newly received data is valid and whether it belongs to noise are usually determined only by comparing whether a difference between the newly received data and the adjacent received data is within a normal range. If the difference between the newly received data and the adjacent received data is within a normal range, it is determined that the newly received data is valid. Otherwise, the newly received data is considered invalid and is noise. Consequently, normal but large-scale data fluctuations may be misjudged, and the misjudgment further needs to be identified and corrected manually. Clearly, the previous processing method in the existing technologies greatly reduces the accuracy of data monitoring and causes adverse impact on data collection and monitoring.

Considering the previous disadvantages, a data monitoring apparatus is provided in the present implementation. After receiving data, the first determination module 801 in the apparatus determines whether the data belongs to a current monitoring data interval. The current monitoring data interval represents a historical data change trend formed by historical data that was received before a current moment. If the data does not belong to the current monitoring data interval, the first determination module 801 preliminarily determines that the new data may deviate from the historical data change trend. The second determination module 802 further determines whether there is an abnormal data interval that matches the data. The abnormal data interval is used to assist in determining whether a new data change trend occurs. If there is an abnormal data interval that matches the data, the second determination module 802 updates the abnormal data interval based on the data. When the abnormal data interval satisfies a first predetermined condition, the third determination module 803 determines the abnormal data interval as the current monitoring data interval. At this time, the new data change trend is generated. According to the technical solutions, multiple data intervals are set, newly received data is sequentially compared with the multiple data intervals, and it is determined, based on characteristics of the data intervals, whether the newly received data belongs to normal data fluctuations. The technical solutions can alleviate misjudgment of normal but large-scale data fluctuations, thereby implementing accurate data monitoring.

Frequency of receiving the data is higher than a predetermined frequency threshold. In other words, the present implementation is more effective for receiving data more frequently.

A quantity of abnormal data intervals can be one, two or more. Certainly, a predetermined interval quantity threshold can also be set to limit the quantity of abnormal data intervals, so that the abnormal data intervals are not excessive; otherwise, accuracy of statistics on the data change trend is affected. When the quantity of the abnormal data intervals is two or more, there can be partial overlap or no overlap between the abnormal data intervals.

In some optional implementations of some embodiments, the abnormal data interval that matches the data means that the data falls within a value range of the abnormal data interval. For example, if a value range of a certain abnormal data interval is 2-6, the newly received data is 5, and 5 falls within the range 2-6. Therefore, it can be considered that the abnormal data interval matches the newly received data. If the newly received data is 7, and 7 does not belong to the range 2-6, it is considered that the abnormal data interval does not match the newly received data.

In some optional implementations of some embodiments, for example, the first predetermined condition can be that the data amount in the abnormal data interval is higher than a first predetermined data amount threshold, or can be that a quantity of times of updating the abnormal data interval is higher than a predetermined times threshold. Certainly, the first predetermined condition can also be set to other conditions, provided that the setting of the first predetermined condition can ensure that the abnormal data interval represents a certain, relatively stable, and new data change trend.

Interval lengths of the current monitoring data interval and the abnormal data interval, or value ranges of the current monitoring data interval and the abnormal data interval can be the same or different, which can be specifically set based on actual application needs. For example, if the current monitoring data interval is considered more important, the interval length of the abnormal data interval can be set to be greater than the interval length of the current monitoring data interval, so that the new data change trend can only replace the historical data change trend after it is sufficiently stable.

For example, assume that the current monitoring data interval is 9-15, there are three abnormal data intervals, the first abnormal data interval is 2-8, the second abnormal data interval is 16-22, the third abnormal data interval is 24-30, and the first predetermined data amount threshold is 6. If the newly received data is 18, it is determined that the data does not belong to the current monitoring data interval 9-15, but there is a second abnormal data interval 16-22 that matches the data, and then the second abnormal data interval is updated based on the new data 18. Then, it is determined whether the data amount in the second abnormal data interval is greater than 6. If the data amount in the second abnormal data interval is greater than 6, the second abnormal data interval 16-22 replaces the current monitoring data interval 9-15 to become a new current monitoring data interval.

Figure 9:
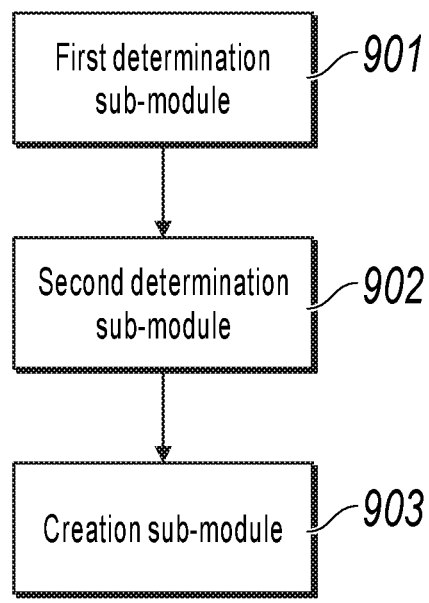
FIG. 9 is a structural block diagram illustrating a first determination module 801 of the data monitoring apparatus, according to the embodiment shown in FIG. 8.

In some optional implementations of some embodiments, as shown in FIG. 9, the first determination module 801 includes the following: a first determination sub-module 901, configured to determine, in response to receiving the data, whether there is a current monitoring data interval; a second determination sub-module 902, configured to: when there is a current monitoring data interval, determine whether the data belongs to the current monitoring data interval; and a creation sub-module 903, configured to: when there is no current monitoring data interval, create a current monitoring data interval based on the received data.

In the present implementation, when receiving new data, the first determination sub-module 901 determines whether there is a current monitoring data interval. If there is a current monitoring data interval, the second determination sub-module 902 further determines whether the data belongs to the current monitoring data interval. If there is no current monitoring data interval, the creation sub-module 903 creates a current monitoring data interval based on the received data. The creation sub-module 903 can create the current monitoring data interval by using the data as an interval central value and a predetermined interval length as a length. The creation time is used as an update time of the current monitoring data interval. Certainly, other interval creation methods can also be used, which is not limited in the present specification.

Figure 10:
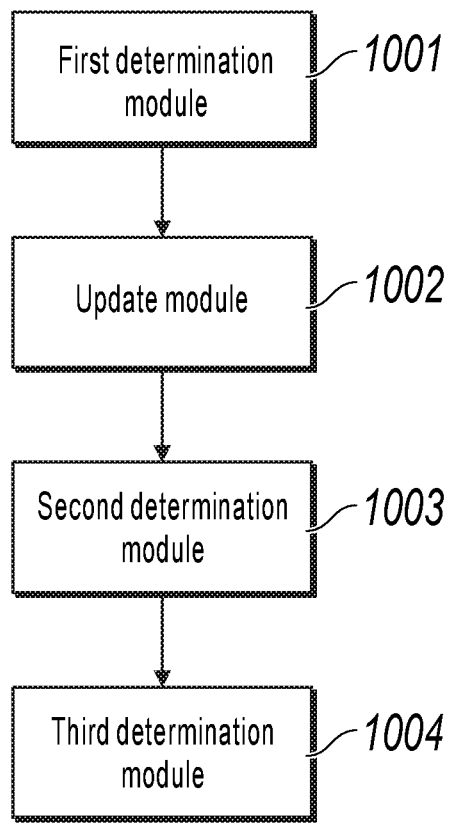
FIG. 10 is a structural block diagram illustrating a data monitoring apparatus, according to other embodiments.

In some optional implementations of some embodiments, as shown in FIG. 10, the apparatus further includes an update module. To be specific, in the present implementation, the apparatus includes the following: a first determination module 1001, configured to determine, in response to receiving data, whether the data belongs to a current monitoring data interval, where frequency of receiving the data is higher than a predetermined frequency threshold; an update module 1002, configured to: when the data belongs to the current monitoring data interval, update the current monitoring data interval based on the data. a second determination module 1003, configured to: when the data does not belong to the current monitoring data interval, determine whether there is an abnormal data interval that matches the data, and when there is an abnormal data interval that matches the data, update the abnormal data interval based on the data; and a third determination module 1004, configured to: when the abnormal data interval satisfies a first predetermined condition, determine the abnormal data interval as the current monitoring data interval.

In the present implementation, when it is determined that the newly received data belongs to the current monitoring data interval, it is considered that the newly received data still follows the historical data change trend, and the update module 1002 updates the current monitoring data interval based on the newly received data.

Figure 11:
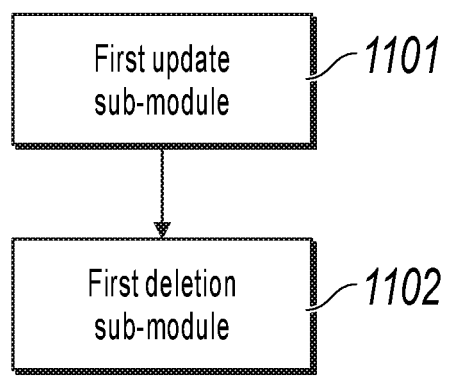
FIG. 11 is a structural block diagram illustrating an update module 1002 of the data monitoring apparatus, according to the embodiment shown in FIG. 10.

In some optional implementations of some embodiments, as shown in FIG. 11, the update module 1002 includes the following: a first update sub-module 1101, configured to: when the data belongs to the current monitoring data interval, update the current monitoring data interval based on the data; and a first deletion sub-module 1102, configured to delete the abnormal data interval.

In the present implementation, when it is determined that the newly received data belongs to the current monitoring data interval, it is considered that the newly received data still follows the historical data change trend. In such case, one or more abnormal data intervals that existed previously no longer have too much reference value. Therefore, after the first update sub-module 1101 updates the current monitoring data interval based on the newly received data, the first deletion sub-module 1102 can delete all abnormal data intervals.

The update module or the update sub-module is configured to perform one or more of the following update operations: updating an interval central value of the current monitoring data interval or the abnormal data interval into the data, and updating an interval range of the current monitoring data interval or the abnormal data interval based on a predetermined interval length; for example, assuming that the current monitoring data interval or the abnormal data interval is 9-15, the central value is 12, and the predetermined interval length is 7, if the newly received data is 14, after the current monitoring data interval or abnormal data interval is updated, the new current monitoring data interval or abnormal data interval becomes the interval 11-17 with the newly received data 14 as the central value and a length of 7; updating a data amount of the current monitoring data interval or the abnormal data interval; and updating a data update time of the current monitoring data interval or the abnormal data interval, where the data update time is used to represent timeliness of the current monitoring data interval or the abnormal data interval.

Figure 12:
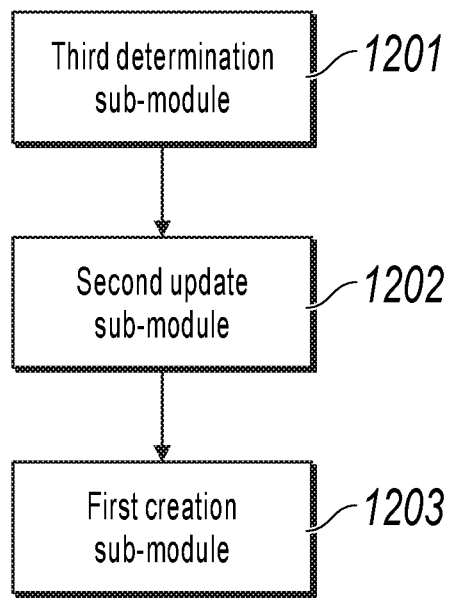
FIG. 12 is a structural block diagram illustrating a second determination module 802 of the data monitoring apparatus, according to the embodiment shown in FIG. 8.

In some optional implementations of some embodiments, as shown in FIG. 12, the second determination module 802 includes the following: a third determination sub-module 1201, configured to: when the data does not belong to the current monitoring data interval, determine whether there is an abnormal data interval that matches the data; a second update sub-module 1202, configured to: when there is an abnormal data interval that matches the data, update the abnormal data interval based on the data; and a first creation sub-module 1203, configured to: when there is no abnormal data interval that matches the data, create an abnormal data interval.

In the present implementation, when it is determined that the newly received data does not belong to the current monitoring data interval, the third determination sub-module 1201 determines whether there is an abnormal data interval that matches the data. Further, if there is an abnormal data interval that matches the data, the second update sub-module 1202 updates the abnormal data interval based on the data. If there is no abnormal data interval that matches the data, the first creation sub-module 1203 creates an abnormal data interval. Similar to creation of the current monitoring data interval previously described, the first creation sub-module 1203 can create the abnormal data interval by using the data as an interval central value and a predetermined interval length as a length. The creation time is used as an update time of the abnormal data interval. Other interval creation methods can also be used.

Figure 13:
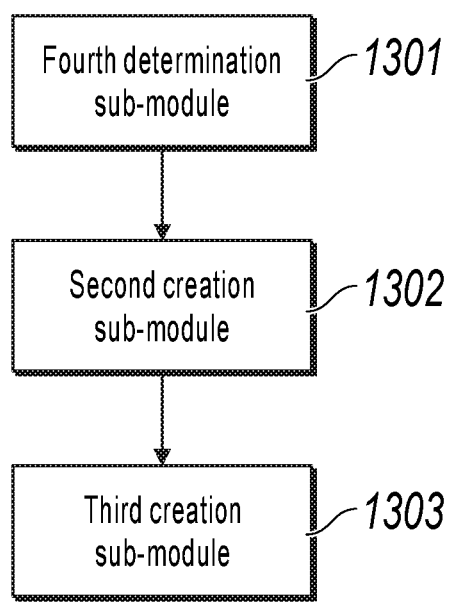
FIG. 13 is a structural block diagram illustrating a first creation sub-module 1203 of the data monitoring apparatus, according to the embodiment shown in FIG. 12.

In some optional implementations of some embodiments, as shown in FIG. 13, the first creation sub-module 1203 includes the following: a fourth determination sub-module 1301, configured to: when there is no abnormal data interval that matches the data, determine whether a quantity of the abnormal data intervals is greater than a predetermined quantity threshold; a second creation sub-module 1302, configured to: when the quantity of the abnormal data intervals is greater than the predetermined quantity threshold, delete an abnormal data interval that satisfies a second predetermined condition, and create an abnormal data interval; and a third creation sub-module 1303, configured to: when the quantity of the abnormal data intervals is not greater than the predetermined quantity threshold, create an abnormal data interval.

In the present implementation, considering that the quantity of abnormal data intervals should not be excessive; otherwise, accuracy of statistics on the data change trend is affected. Therefore, when it is determined that there is no abnormal data interval that matches the data, the fourth determination sub-module 1301 determines whether the quantity of currently existing abnormal data intervals is greater than the predetermined interval quantity threshold. If yes, it indicates that the quantity of current abnormal data intervals is excessively large, and the second creation sub-module 1302 deletes an abnormal data interval and then creates an abnormal data interval. Otherwise, the third creation sub-module 1303 directly creates an abnormal data interval.

The second predetermined condition can be one or more of the following conditions: the update time of the abnormal data interval is earlier than the predetermined time threshold, that is, the abnormal data interval with an excessively early update time is deleted; and the data amount of the abnormal data interval is lower than the second predetermined data amount threshold, that is, the abnormal data interval with a small data amount is deleted.

Figure 14:
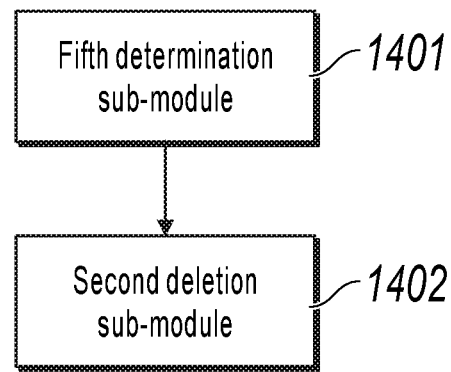
FIG. 14 is a structural block diagram illustrating a third determination module 803 of the data monitoring apparatus, according to the embodiment shown in FIG. 8.

In some optional implementations of some embodiments, as shown in FIG. 14, the third determination module 803 includes the following: a fifth determination sub-module 1401, configured to: when the abnormal data interval satisfies a first predetermined condition, determine the abnormal data interval as the current monitoring data interval; and a second deletion sub-module 1402, configured to delete the abnormal data interval.

In the present implementation, when it is determined that the abnormal data interval satisfies the first predetermined condition, it is considered that the abnormal data interval is sufficient to represent the new data change trend, and other abnormal data intervals no longer have reference value. Therefore, after the fifth determination sub-module 1401 replaces the current monitoring data interval with the abnormal data interval to become a new current monitoring data interval, the second deletion sub-module 1402 deletes all other abnormal data intervals.

The predetermined frequency threshold, the predetermined interval quantity threshold, the first predetermined data amount threshold, the predetermined times threshold, the predetermined time threshold, and the second predetermined data amount threshold can be set based on actual application needs, which is not limited in the present specification.

Figure 15:
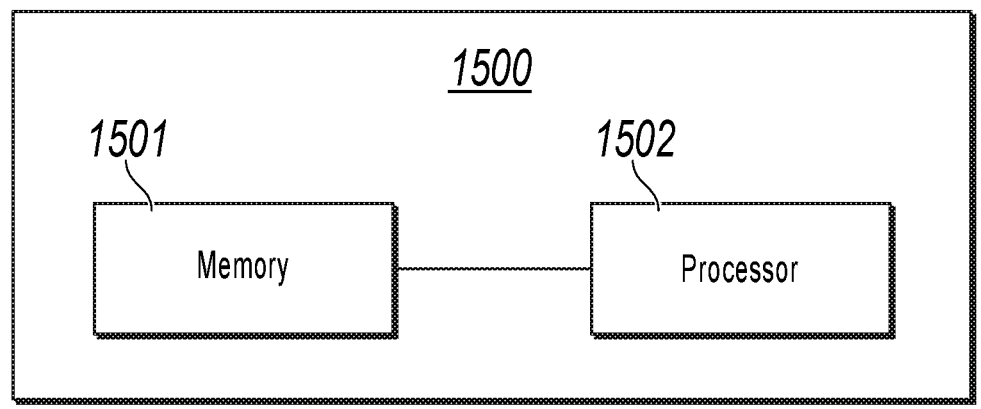
FIG. 15 is a structural block diagram illustrating an electronic device, according to some embodiments of the present specification.

Some embodiments of the present specification further disclose an electronic device. FIG. 15 is a structural block diagram illustrating an electronic device, according to some embodiments of the present specification. As shown in FIG. 15, the electronic device 1500 includes a memory 1501 and a processor 1502.

The memory 1501 is configured to store one or more computer instructions, where the one or more computer instructions are executed by the processor 1502 to perform the steps of any previous method.

Figure 16:
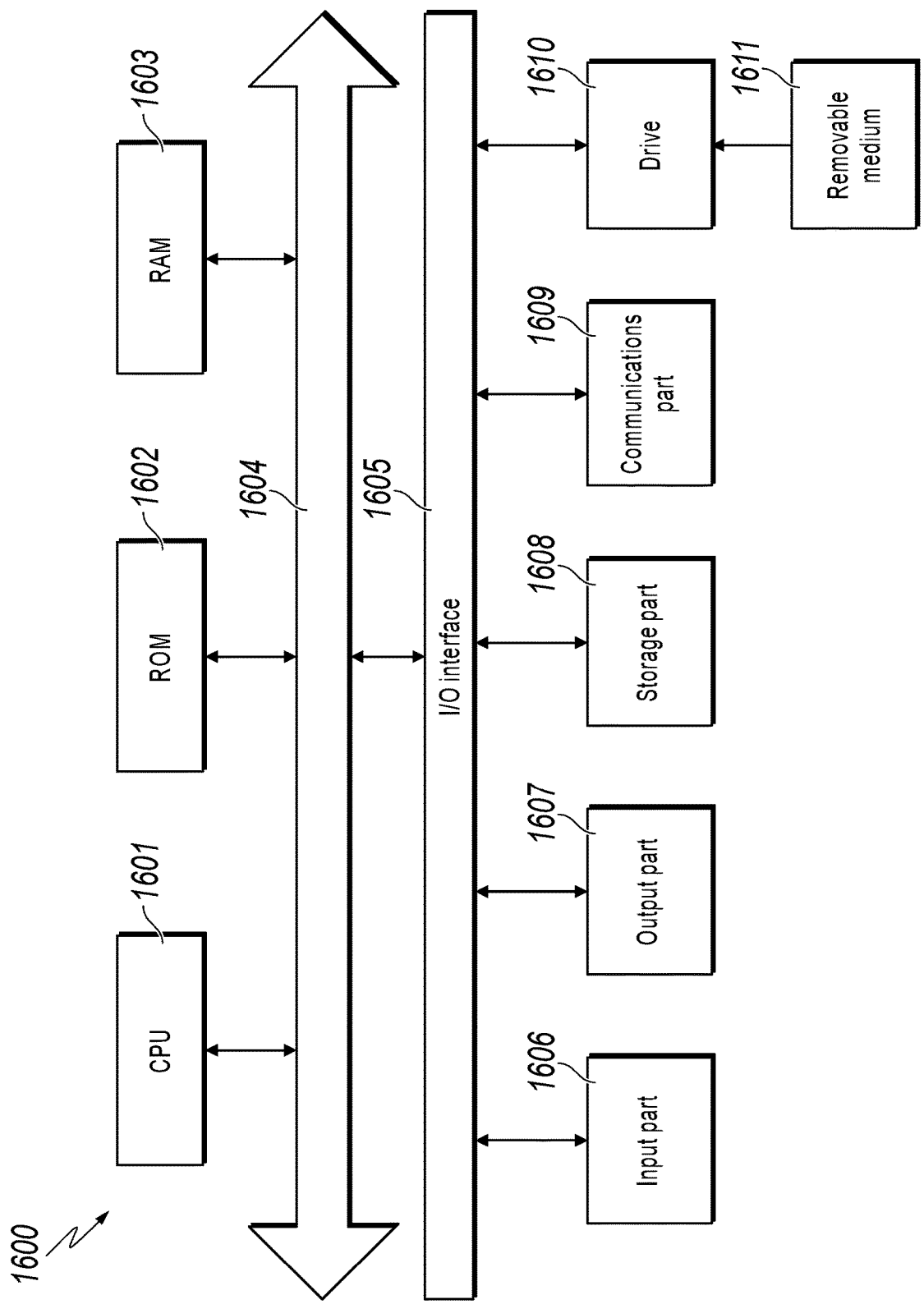
FIG. 16 is a schematic structural diagram illustrating a computer system that is suitable for implementing a data monitoring method, according to some embodiments of the present specification.

FIG. 16 is a schematic structural diagram illustrating a computer system that is suitable for implementing a data monitoring method, according to some embodiments of the present specification.

As shown in FIG. 16, a computer system 1600 includes a central processing unit (CPU) 1601. The CPU 1601 can perform various types of processing in the previous implementations based on a program that is stored in a read-only memory (ROM) 1602 or a program that is loaded from a storage part 1608 to a random access memory (RAM) 1603. The RAM 1603 further stores various programs and data necessary for operating the system 1600. The CPU 1601, the ROM 1602, and the RAM 1603 are connected to each other through a bus 1604. An input/output (I/O) interface 1605 is also connected to the bus 1604.

The following components are connected to the I/O interface 1605: an input part 1606 that includes a keyboard, a mouse, etc.; an output part 1607 that includes a cathode ray tube (CRT), a liquid crystal display (LCD), a speaker, etc.; the storage part 1608 that includes a hard disk, etc.; and a communications part 1609 that includes a network interface card such as a LAN card, a modem, etc. The communications part 1609 performs communication processing via a network such as the Internet. A drive 1610 is also connected to the I/O interface 1605 as needed. A removable medium 1611 such as a magnetic disk, an optical disc, a magneto-optical disc, a semiconductor memory, etc. is installed on the drive 1610 as needed, so that a computer program that is read from the removable medium 1611 is installed into the storage part 1608 as needed.

In particular, according to the implementations of the present specification, the previously described method can be implemented as a computer software program. For example, the implementations of the present specification include a computer program product that includes a computer program tangibly contained on its readable medium. The computer program includes program code for performing the data monitoring method. In such implementations, the computer program can be downloaded and installed from a network by using the communications part 1609, and/or installed from the removable medium 1611.

The flowcharts and block diagrams in the accompanying drawings show the architectures, functions, and operations that may be implemented according to the systems, methods, and computer program products in various implementations of the present specification. In this regard, each block in the flowchart or block diagram can represent one module, one program segment, or one part of code. The module, the program segment, or the part of code includes one or more executable instructions for implementing specified logical functions. It is also worthwhile to note that, in some alternative implementations, the functions marked in the blocks can occur in an order different from that marked in the figures. For example, two consecutive blocks can actually be executed in parallel, and sometimes they can also be executed in reverse order, depending on the function involved. It is also worthwhile to note that, each block in the block diagram and/or flowchart, and a combination of blocks in the block diagram and/or flowchart can be implemented by using a dedicated hardware-based system that performs a specified function or operation, or can be implemented by using a combination of dedicated hardware and computer instructions.

The units or modules described in the implementations of the present specification can be implemented by software or hardware. The units or modules described can also be disposed in the processor. In some cases, names of these units or modules do not constitute a limitation on the units or modules.

In another aspect, some embodiments of the present specification further provide a computer readable storage medium. The computer readable storage medium can be a computer readable storage medium included in the apparatus in the previous implementations, or can be a stand-alone computer readable storage medium that is not assembled into a device. The computer readable storage medium stores one or more programs, and the programs are used by one or more processors to perform the methods described in some embodiments of the present specification.

The previous descriptions are merely some preferred embodiments of the present specification and the explanation of the applied technical principles. A person skilled in the art should understand that, the disclosure scope of some embodiments of the present specification is not limited to the technical solutions formed by the specific combination of the previous technical features, but should also cover other technical solutions formed by any combination of the previous technical features or their equivalent features without departing from the described inventive concepts, for example, a technical solution formed by interchanging the previous features and the technical features that are disclosed (but not limited thereto) in some embodiments of the present specification having similar functions.

What is claimed is:

1. A computer-implemented method for data monitoring, comprising:
    receiving, from an electronic device, data at a frequency range higher than a predetermined frequency;
    determining whether the data belongs to a currently monitored data interval;
    in response to determining that the data does not belong to the currently monitored data interval, determining whether the data belongs to an abnormal data interval of a plurality of abnormal data intervals;
    in response to determining that the data belongs to the abnormal data interval, updating the abnormal data interval based on the data; and
    updating the currently monitored data interval to be the abnormal data interval in response to determining that the abnormal data interval satisfies a predetermined condition.

2. The computer-implemented method according to claim 1, further comprising:
    before determining whether the data belongs to a currently monitored data interval, determining that the currently monitored data interval does not exist; and
    creating the currently monitored data interval based on the received data.

3. The computer-implemented method according to claim 1, further comprising
    in response to determining that the data belongs to the currently monitored data interval, updating the currently monitored data interval based on the data.

4. The computer-implemented method according to claim 3, wherein updating the abnormal data interval or the currently monitored data interval comprise:
    updating a median value, an interval length based on a predetermined interval length, a quantity of elements, and an update time of the abnormal data interval or the currently monitored data interval.

5. The computer-implemented method according to claim 3, further comprising:
    deleting the plurality of abnormal data intervals.

6. The computer-implemented method according to claim 1, further comprising:
    in response to determining that the data does belongs to none of the plurality of abnormal data intervals, creating a new abnormal data interval based on the data.

7. The computer-implemented method according to claim 6, wherein the predetermined condition is a first predetermined condition, and the creating the new abnormal data interval comprises:
    determining whether a quantity of the plurality of abnormal data intervals is greater than a predetermined threshold;
    in response to determining that the quantity of the plurality of abnormal data intervals is greater than the predetermined threshold:
        deleting a second abnormal data interval of the plurality of abnormal data intervals that satisfies a second predetermined condition; and
        creating the new abnormal data interval; and
    in response to determining that the quantity of the plurality of abnormal data intervals is less than or equal to the predetermined threshold, creating the new abnormal data interval.

8. The computer-implemented method according to claim 7, further comprising:
    deleting the abnormal data interval.

9. A non-transitory, computer-readable storage medium storing one or more instructions executable by a computer system to perform operations comprising:
    receiving, from an electronic device, data at a frequency range higher than a predetermined frequency;
    determining whether the data belongs to a currently monitored data interval;
    in response to determining that the data does not belong to the currently monitored data interval, determining whether the data belongs to an abnormal data interval of a plurality of abnormal data intervals;
    in response to determining that the data belongs to the abnormal data interval, updating the abnormal data interval based on the data; and
    updating the currently monitored data interval to be the abnormal data interval in response to determining that the abnormal data interval satisfies a predetermined condition.

10. The non-transitory, computer-readable storage medium according to claim 9, the operations further comprising:
    before determining whether the data belongs to a currently monitored data interval, determining that the currently monitored data interval does not exist; and
    creating the currently monitored data interval based on the received data.

11. The non-transitory, computer-readable storage medium according to claim 9, the operations further comprising in response to determining that the data belongs to the currently monitored data interval, updating the currently monitored data interval based on the data.

12. The non-transitory, computer-readable storage medium according to claim 11, wherein updating the abnormal data interval or the currently monitored data interval comprise:
 updating a median value, an interval length based on a predetermined interval length, a quantity of elements, and an update time of the abnormal data interval or the currently monitored data interval.

13. The non-transitory, computer-readable storage medium according to claim 11, the operations further comprising:
 deleting the plurality of abnormal data intervals.

14. The non-transitory, computer-readable storage medium according to claim 9, the operations further comprising:
 in response to determining that the data does belongs to none of the plurality of abnormal data intervals, creating a new abnormal data interval based on the data.

15. The non-transitory, computer-readable storage medium according to claim 14, wherein the predetermined condition is a first predetermined condition, and the creating the new abnormal data interval comprises:
 determining whether a quantity of the plurality of abnormal data intervals is greater than a predetermined threshold;
 in response to determining that the quantity of the plurality of abnormal data intervals is greater than the predetermined threshold:
  deleting a second abnormal data interval of the plurality of abnormal data intervals that satisfies a second predetermined condition; and
  creating the new abnormal data interval; and
 in response to determining that the quantity of the plurality of abnormal data intervals is less than or equal to the predetermined threshold, creating the new abnormal data interval.

16. The non-transitory, computer-readable storage medium according claim 15, the operations further comprising:
 deleting the abnormal data interval.

17. A computer-implemented system for data monitoring, comprising:
 one or more processors; and
 a memory interoperably coupled with the one or more processors and storing one or more instructions executable by the one or more processors to perform operations comprising:
 receiving, from an electronic device, data at a frequency range higher than a predetermined frequency;
 determining whether the data belongs to a currently monitored data interval;
 in response to determining that the data does not belong to the currently monitored data interval, determining whether the data belongs to an abnormal data interval of a plurality of abnormal data intervals;
 in response to determining that the data belongs to the abnormal data interval, updating the abnormal data interval based on the data; and
 updating the currently monitored data interval to be the abnormal data interval in response to determining that the abnormal data interval satisfies a predetermined condition.

18. The computer-implemented system according to claim 17, the operations further comprising:
 before determining whether the data belongs to a currently monitored data interval, determining that the currently monitored data interval does not exist; and
 creating the currently monitored data interval based on the received data.

19. The computer-implemented system according to claim 17, the operations further comprising
 in response to determining that the data belongs to the currently monitored data interval, updating the currently monitored data interval based on the data.

20. The computer-implemented system according to claim 19, wherein updating the abnormal data interval or the currently monitored data interval comprise:
 updating a median value, an interval length based on a predetermined interval length, a quantity of elements, and an update time of the abnormal data interval or the currently monitored data interval.

21. The computer-implemented system according to claim 19, the operations further comprising:
 deleting the plurality of abnormal data intervals.

22. The computer-implemented system according to claim 17, the operations further comprising:
 in response to determining that the data does belongs to none of the plurality of abnormal data intervals, creating a new abnormal data interval based on the data.

23. The computer-implemented system according to claim 22, wherein the predetermined condition is a first predetermined condition, and the creating the new abnormal data interval comprises:
 determining whether a quantity of the plurality of abnormal data intervals is greater than a predetermined threshold;
 in response to determining that the quantity of the plurality of abnormal data intervals is greater than the predetermined threshold:
  deleting a second abnormal data interval of the plurality of abnormal data intervals that satisfies a second predetermined condition; and
  creating the new abnormal data interval; and
 in response to determining that the quantity of the plurality of abnormal data intervals is less than or equal to the predetermined threshold, creating the new abnormal data interval.

24. The computer-implemented system according to claim 23, the operations further comprising:
 deleting the abnormal data interval.

* * * * *

UNITED STATES PATENT AND TRADEMARK OFFICE
CERTIFICATE OF CORRECTION

| | |
|---|---|
| PATENT NO. | : 11,200,136 B2 |
| APPLICATION NO. | : 17/086172 |
| DATED | : December 14, 2021 |
| INVENTOR(S) | : Yuzhu Li |

It is certified that error appears in the above-identified patent and that said Letters Patent is hereby corrected as shown below:

In the Claims

Column 19, Line 41, in Claim 16, after "according" insert -- to --.

Signed and Sealed this
Third Day of May, 2022

Katherine Kelly Vidal
*Director of the United States Patent and Trademark Office*